(12) United States Patent
O'Brien et al.

(10) Patent No.: US 10,081,492 B1
(45) Date of Patent: Sep. 25, 2018

(54) ZONED ACCUMULATION CONVEYOR WITH ELECTRICAL ACTUATOR AND ASSOCIATED METHOD

(71) Applicant: HYTROL CONVEYOR COMPANY, INC., Jonesboro, AR (US)

(72) Inventors: Charles David O'Brien, Harrisburg, AR (US); Joshua Edward Eversoll, Jonesboro, AR (US); Cole Jeremiah Prince, Jonesboro, AR (US); Gregory Allen Bauders, Jonesboro, AR (US); Joseph Wayne Pillow, Paragould, AR (US); Boyce Dean Bonham, Bono, AR (US)

(73) Assignee: Hytrol Conveyor Company, Inc., Jonesboro, AR (US)

( * ) Notice: Subject to any disclaimer, the term of this patent is extended or adjusted under 35 U.S.C. 154(b) by 0 days.

(21) Appl. No.: 15/921,345

(22) Filed: Mar. 14, 2018

(51) Int. Cl.
*B65G 13/06* (2006.01)
*B65G 13/07* (2006.01)
*B65G 13/11* (2006.01)
*B65G 13/071* (2006.01)

(52) U.S. Cl.
CPC ........... *B65G 13/07* (2013.01); *B65G 13/071* (2013.01); *B65G 13/11* (2013.01); *B65G 2201/0235* (2013.01)

(58) Field of Classification Search
CPC .................................................... B65G 13/071
USPC ..... 198/617, 781.01, 781.03, 781.06, 781.09
See application file for complete search history.

(56) References Cited

U.S. PATENT DOCUMENTS

| | | | | |
|---|---|---|---|---|
| 4,697,694 A | * | 10/1987 | Huber | B65G 13/065 198/782 |
| 4,792,037 A | * | 12/1988 | Huber | B65G 13/065 198/782 |
| 5,131,527 A | * | 7/1992 | Huber | B65G 13/065 198/782 |
| 5,547,069 A | * | 8/1996 | Pritchard | B64D 9/00 198/782 |
| 5,749,454 A | * | 5/1998 | Layne | B65G 13/00 198/464.4 |
| 5,984,615 A | * | 11/1999 | Sundseth | B64C 1/20 198/782 |
| 6,035,999 A | * | 3/2000 | Hall | B65G 13/06 198/781.06 |
| 6,047,812 A | * | 4/2000 | Horn | B65G 43/10 198/460.3 |

(Continued)

*Primary Examiner* — Douglas A Hess
(74) *Attorney, Agent, or Firm* — Alston & Bird LLP

(57) ABSTRACT

A belt drive assembly for driving at least one tread roller of a belt-driven live roller conveyor and associated methods are provided that uses an electrically actuated assembly to raise and lower a belt into and out of engagement with tread rollers to selectively transport or accumulate product. The assembly includes a stationary frame having a magnet and a movable frame having an attractant plate, or vice versa. The magnet may be an electromagnet or a solenoid. The movable frame is movable with respect to the stationary frame, such that when an electric current is applied to the magnet, the magnet and the attractant plate are magnetically drawn to each other and cause the movable frame to move towards a respective portion of the stationary frame to place the belt drive assembly in a driving configuration in which at least one tread roller of the conveyor in engaged.

19 Claims, 6 Drawing Sheets

(56) References Cited

U.S. PATENT DOCUMENTS

| | | | | |
|---|---|---|---|---|
| 6,471,043 B2 * | 10/2002 | Schwingshandl | ...... | B65G 13/07 |
| | | | | 198/781.06 |
| 6,889,615 B2 * | 5/2005 | Johnson | ................ | B61B 10/025 |
| | | | | 104/162 |
| 8,186,501 B2 * | 5/2012 | Wolkerstorfer | ........ | B65G 23/08 |
| | | | | 198/781.03 |
| 9,004,263 B2 * | 4/2015 | Hall | ....................... | B65G 43/00 |
| | | | | 198/571 |

* cited by examiner

ZONED ACCUMULATION CONVEYOR WITH ELECTRICAL ACTUATOR AND ASSOCIATED METHOD

BACKGROUND OF THE INVENTION

The present invention is directed to conveyor systems, and more particularly, to a zoned accumulation conveyor that is electrically actuated.

Conveyor systems are used to transport goods, packages, cartons, and other objects in all types of environments and experience heavy use in the manufacturing and shipping industries. A belt driven live roller conveyor is a conveyor that is designed to carry product directly on carrying rollers. A belt is used to drive the carrying rollers and convey the product to its destination.

In some applications, product must be stored in certain areas of the conveyor, or accumulation zones, before it can be conveyed to the next area. In such cases, zoned accumulation conveyors are used. Zoned accumulation conveyors have the ability to engage and disengage drive to specific zones along the length of the conveyor. Some conventional accumulation conveyors use a drive motor positioned in each zone to drive the rollers in only that zone. As such, accumulation occurs when the drive motor is turned off, while drive occurs when the drive motor is turned on. Other conventional zoned accumulation conveyors, such as belt driven live roller accumulation conveyors, use compressed air in conjunction with an actuator to engage or disengage the rollers for conveying product or allowing product to accumulate, respectively. Such pneumatic actuators are expensive to install and maintain.

BRIEF SUMMARY OF THE INVENTION

Through hard work and ingenuity, the inventors have developed a cost-effective electrical actuator system that eliminates the need for a pneumatic actuator for raising and lowering a drive belt to engage the drive and disengage the drive to rollers in a belt driven live roller zoned accumulation conveyor. Embodiments of the invention described herein therefore provide improved systems and methods for driving rollers in a belt driven zoned accumulation conveyor by using an electrical actuator instead of a pneumatic actuator to engage and/or disengage the driving belt with the conveying rollers.

In some embodiments, a belt drive assembly for driving at least one tread roller of a belt-driven live roller conveyor is provided, where the assembly comprises a stationary frame and a movable frame. The stationary frame is configured to be fixed to a support structure of a belt-driven live roller conveyor. The movable frame is configured to be supported within and movable with respect to the stationary frame. A first magnetic component is secured to the stationary frame, and a second magnetic component is secured to the movable frame. One of the first magnetic component or the second magnetic component is an electrically actuated magnet, and the other of the first magnetic component or the second magnetic component is an attractant plate.

The second magnetic component may be substantially aligned with the first magnetic component such that, in an actuated state in which an electric current is applied to a respective one of the first or second magnetic components, the first and second magnetic components are magnetically drawn to each other and cause the movable frame to move towards a respective portion of the stationary frame, such that the assembly achieves a driving configuration. In the driving configuration a driven belt may engage at least one tread roller of the belt-driven live roller conveyor, such that a product supported by the at least one tread roller that is engaged by the belt is conveyed along the belt-driven live roller conveyor.

In some cases, in a non-actuated state in which the electric current is removed from a respective one of the first or second magnetic components, the first and second magnetic components may cease to be magnetically drawn to each other and gravity may cause the movable frame to move with respect to the stationary frame such that the assembly returns to a non-driving configuration in which the belt is disengaged from the at least one tread roller.

The first magnetic component may be an electromagnet or a solenoid and the second magnetic component may be an attractant plate. Additionally or alternatively, the second magnetic component may be an electromagnet or a solenoid and the first magnetic component may be an attractant plate.

In some cases, the stationary frame may comprise a pair of pressure rollers disposed at opposite ends of the movable frame. The pair of pressure rollers may be configured to engage and drive the belt, and in the actuated state in which an electric current is applied to a respective one of the first or second magnetic components, the pair of pressure rollers moves with the movable frame to move the belt into engagement with the at least one tread roller of the belt-driven live roller conveyor. The stationary frame may further comprise a pair of belt guides disposed on the stationary frame and configured to maintain the belt in an operational position with respect to the pair of pressure rollers.

In some cases, at least one of the driven tread rollers may be operably connected to an additional tread roller via a drive transmission member.

In other embodiments, a belt drive assembly for driving at least one tread roller of a belt-driven live roller conveyor is provided. The assembly may comprise a stationary frame configured to be fixed to a support structure of a belt-driven live roller conveyor, and a movable frame configured to be supported within and movable with respect to the stationary frame. The assembly may further comprise an electric actuating assembly configured to cause the movable frame to move with respect to a respective portion of the stationary frame, such that the assembly is moved between a driving configuration and a non-driving configuration. In the driving configuration, a driven belt is engaged with at least one tread roller of the belt-driven live roller conveyor, such that a product supported by the at least one tread roller that is engaged by the belt is conveyed along the belt-driven live roller conveyor. In the non-driving configuration, the driven belt is disengaged from the at least one tread roller of the belt-driven live roller conveyor, such that the product supported by the at least one tread roller is accumulated along the belt-driven live roller conveyor.

In some cases, the electric actuating assembly may comprise a first magnetic component secured to the stationary frame and a second magnetic component secured to the movable frame. One of the first magnetic component or the second magnetic component may be an electrically actuated magnet and the other of the first magnetic component or the second magnetic component may be an attractant plate. The second magnetic component may be substantially aligned with the first magnetic component such that, in an actuated state in which an electric current is applied to a respective one of the first or second magnetic components, the first and second magnetic components are magnetically drawn to each other and cause the movable frame to move towards a respective portion of the stationary frame, such that the assembly achieves the driving configuration.

In some cases, the electric actuating assembly may comprise a first magnetic component secured to the stationary frame and a second magnetic component secured to the movable frame, wherein one of the first magnetic component or the second magnetic component is an electrically actuated magnet and the other of the first magnetic component or the second magnetic component is an attractant plate. The second magnetic component may be substantially aligned with the first magnetic component such that, in an actuated state in which an electric current is applied to a respective one of the first or second magnetic components, the first and second magnetic components magnetically repel each other and cause the movable frame to move away from a respective portion of the stationary frame, such that the assembly achieves the non-driving configuration.

The first magnetic component may be an electromagnet or a solenoid and the second magnetic component may be an attractant plate. Additionally or alternatively, the second magnetic component may be an electromagnet or a solenoid and the first magnetic component may be an attractant plate.

In still other embodiments, a method of driving at least one tread roller of a belt-driven live roller conveyor is provided, where the method comprises electrically actuating one of a first magnetic component or a second magnetic component of a belt drive assembly. The first magnetic component may be secured to a stationary frame that is configured to be fixed to a support structure of a belt-driven live roller conveyor and the second magnetic component may be secured to a movable frame supported within and movable with respect to the stationary frame. Electrically actuating one of the first magnetic component or the second magnetic component may cause the movable frame to move towards a respective portion of the stationary frame, such that the assembly achieves a driving configuration. In the driving configuration, a driven belt may engage at least one tread roller of the belt-driven live roller conveyor, such that a product supported by the at least one tread roller that is engaged by the belt is conveyed along the belt-driven live roller conveyor.

In some cases, the electric current may be removed from a respective one of the first magnetic component or the second magnetic component, such that the first and second magnetic components cease to be magnetically drawn to each other and gravity causes the movable frame to move with respect to the stationary frame such that the assembly returns to a non-driving configuration in which the belt is disengaged from the at least one tread roller.

The first magnetic component may be an electromagnet or a solenoid and the second magnetic component may be an attractant plate. Additionally or alternatively, the second magnetic component may be an electromagnet or a solenoid and the first magnetic component may be an attractant plate.

Furthermore, the stationary frame may comprise a pair of pressure rollers disposed at opposite ends of the movable frame. The pair of pressure rollers may be configured to engage and drive the belt, and in the actuated state in which an electric current is applied to a respective one of the first or second magnetic components, the pair of pressure rollers may move with the movable frame to move the belt into engagement with the at least one tread roller of the belt-driven live roller conveyor.

The stationary frame may comprise a pair of belt guides disposed on the stationary frame and configured to maintain the belt in an operational position with respect to the pair of pressure rollers.

In some cases, drive may be transmitted from at least one of the driven tread rollers to an additional roller via a drive transmission member.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
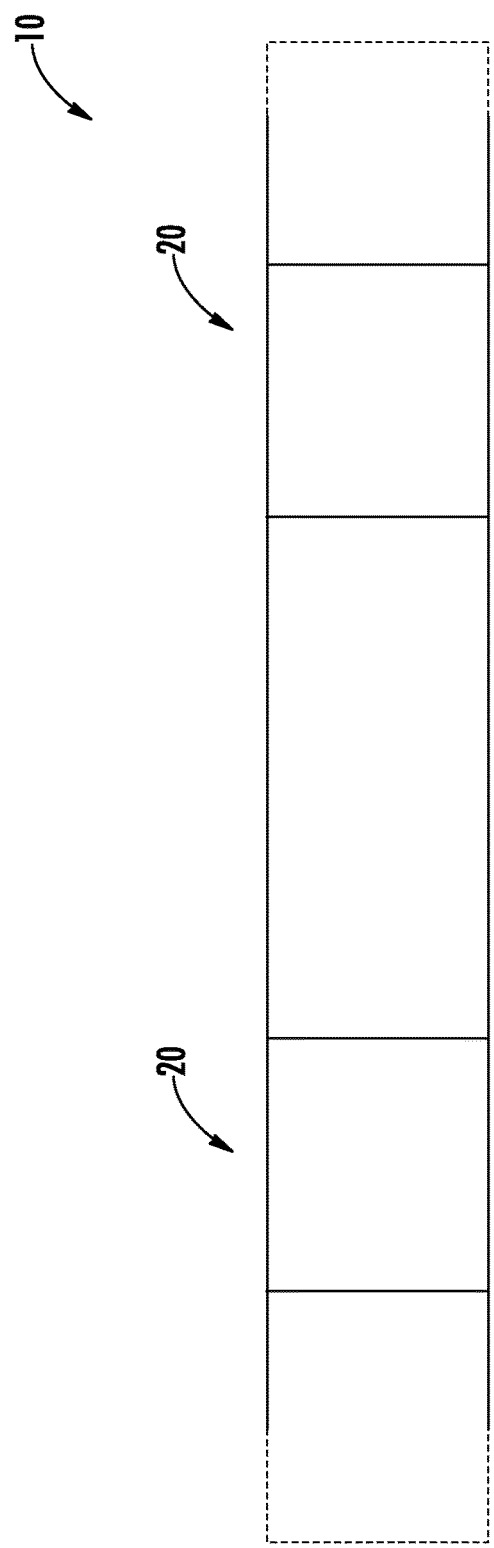
FIG. 1 shows a simplified top plan view of a conveyor system according to one embodiment of the present invention.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

As noted above, zoned accumulation conveyors are often used in applications where product must be stored in certain areas of the conveyor, or accumulation zones, along the length of the conveyor before it can be moved to the next area. Product is accumulated in such zones by selectively driving or removing drive to the rollers via a driven belt running the length of the conveyor. In particular, a drive motor may be configured to drive a continuous belt running the length of the conveyor, and when the driven belt is in contact with the drive rollers in the accumulation zone, the product is advanced along the conveyor path. When the driven belt is not in contact with the drive rollers in the accumulation zone, the drive rollers stop moving and the product accumulates in that zone.

Conventional zoned accumulation conveyors use compressed air to engage or disengage the rollers for conveying product or allowing product to accumulate, respectively. For example, an air cylinder or an air bag (e.g., an air puck) may be used to move the driven belt into and out of contact with the rollers. When in contact, the driven belt turns the contacting rollers to convey the product in that zone. When not in contact, the driven belt is spaced from the rollers and the rollers are no longer receiving energy from the belt and stop moving, thereby causing the product in that zone to stop moving.

In some conventional systems, the actuating assemblies support the driven belts and are moved into contact with the rollers using springs that bias the assemblies in the contact (driving) position. Compressed air-operated actuators may be used in these cases to push the actuating assemblies away from the rollers, overcoming the biasing force of the springs and breaking contact between the belt and the rollers to allow the rollers to stop moving and accumulate product. In still other conventional systems, compressed air-operated actuators may be used to hold the actuating assemblies in the contact position, such that the driven belt drives the rollers and conveys product, and gravity may be used to separate the actuating assemblies from the rollers when the compressed air is ceased.

Although generally relied upon in conventional systems for engaging and disengaging the driven belt with the rollers, such pneumatic actuators and the associated compressed air systems are expensive. In addition to the cost of the compressor, the piping, and the other equipment needed to operate such pneumatic systems, the operating costs and maintenance of pneumatic systems is also generally high. For example, air leaks in such systems are often not fixed, resulting in inefficiencies and unnecessary costs. Moreover, the pneumatic actuator, whether it is in the form of a cylinder or an air bag, is an item that requires much maintenance due to its frequent operation when accumulating and driving products through a conveyor system.

Accordingly, embodiments of the present invention use an electrical actuator rather than a pneumatic actuator to drive the rollers and/or remove drive from the rollers in the accumulation zones of a zoned accumulation conveyor, thereby eliminating the need for expensive compressed air systems. In particular, as described in greater detail below, embodiments of the claimed invention use an electromagnet to move the driven belt of the actuating system into and/or out of engagement with the rollers.

Referring now to FIG. 1, a plan view of a conveyor system 10 is shown that includes two accumulation zones 20, for the purposes of illustration. It will be understood by one skilled in the art in light of this disclosure that although the depicted conveyor system 10 has a single, linear path, embodiments of the present invention may be applied to conveyor systems that include a number of branches for conveying product to different destinations and may be curved or have various portions of different lengths and shapes. Moreover, although the depicted example includes two accumulation zones 20, embodiments of the invention as described herein may be applied to conveyor systems with one or three or four or any number of accumulation zones.

Figure 2:
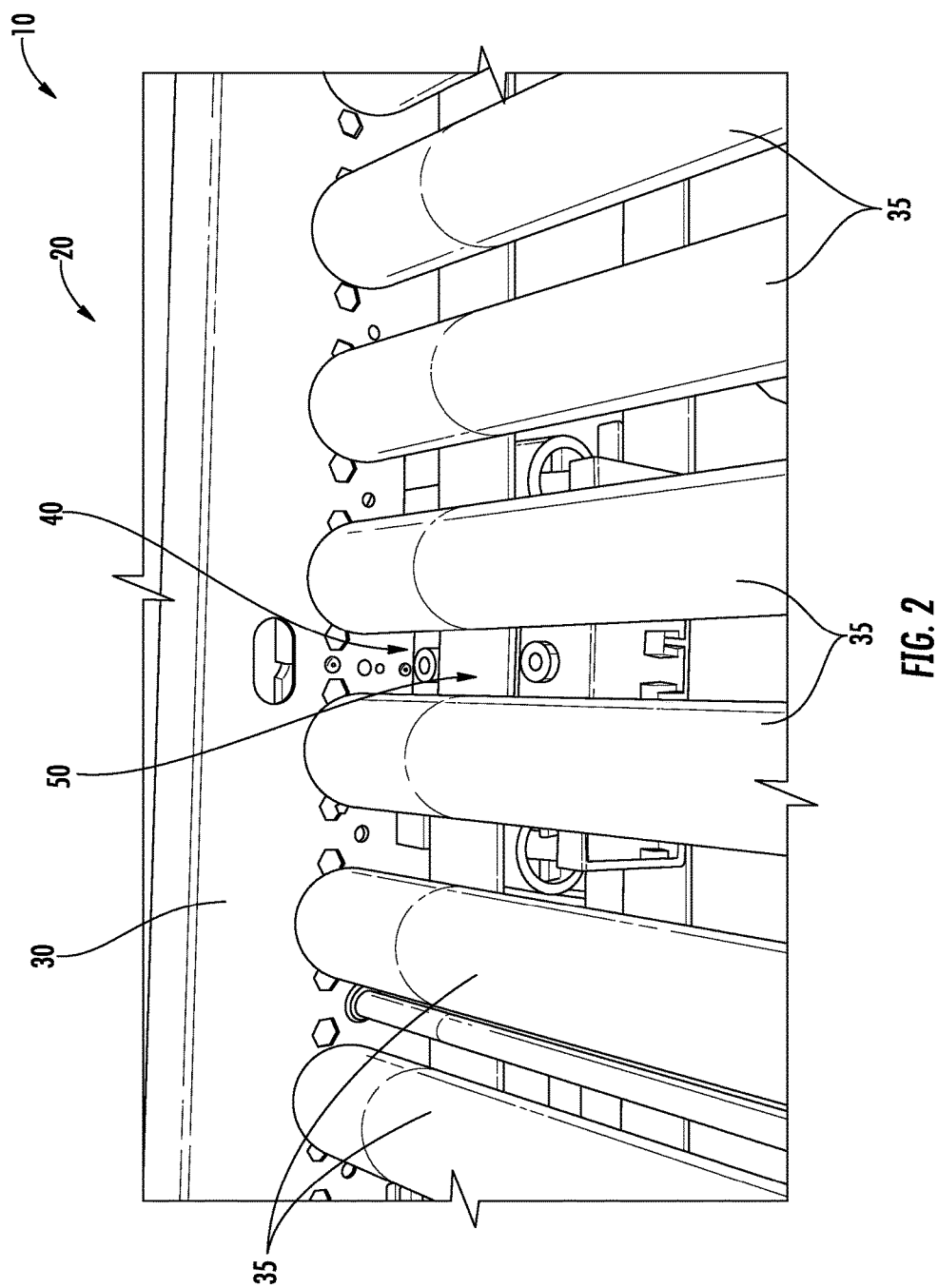
FIG. 2 shows a close-up perspective view of an accumulation zone of the conveyor system of FIG. 1 according to embodiments of the present invention.

In FIG. 2, a portion of the conveyor system 10 of FIG. 1 is shown in the area of one of the accumulation zones 20 according to one embodiment of the present invention. In particular, in some embodiments, the conveyor system 10 may be a belt-driven live roller conveyor that includes a support structure 30, such as a side rail, configured to support the conveyor system, its components, and the conveyed product. The conveyor system 10 may further include a plurality of tread rollers 35 upon which the product is placed and through the movement of which the product is conveyed along the conveyor system path.

In order to drive the tread rollers 35 in the accumulation zone 20 when product is to be moved and stop driving the tread rollers in the accumulation zone when product is to be accumulated, embodiments of the invention provide an electrically actuated belt drive assembly 40 for driving and/or removing drive from a belt 50 of the belt-driven live roller conveyor 10. The assembly 40 is configured to move the driven belt 50 into contact with one or more of the tread rollers 35 and out of contact with the one or more tread rollers.

Figure 3:
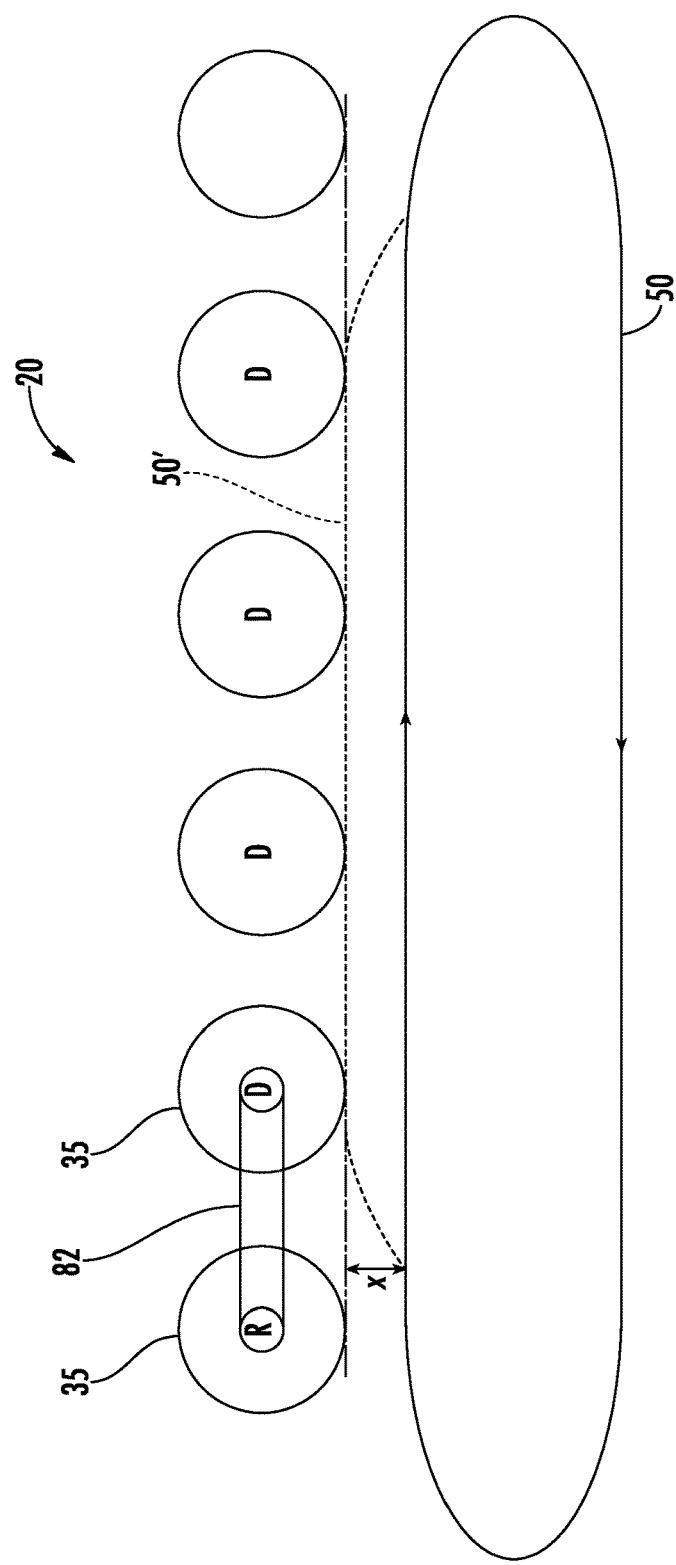
FIG. 3 shows a simplified side view of the position of a driven belt with respect to tread rollers of the conveyer system in a driving configuration and a non-driving configuration according to embodiments of the present invention.

With reference to FIG. 3, for example, the assembly may be configured to drive a belt 50 such that, when the assembly is in a driving configuration, the driven belt engages and turns one or more tread rollers 35. In the depicted example, at least a portion 50' of the belt 50 and pressure frame system (shown in dashed lines) is configured (e.g., sized and shaped) to be raised to an engagement position so as to engage and transmit drive to four tread rollers 35 (labelled D). When the assembly is in a non-driving configuration (e.g., when the portion shown in dashed lines 50' is lowered again to the non-engagement position shown in solid lines in FIG. 3), the belt 50 is spaced from the previously engaged tread rollers 35 (D), such that no contact is made and the belt 50 is not able to turn the tread rollers. In the depicted example of FIG. 3, in the non-driving configuration, the belt or belt portion 50' is moved down by a distance of x, and, as such, the belt 50 is spaced from the tread rollers 35 (D) by a distance of x. In some embodiments, for example, the belt 50 is raised and lowered by a distance x of approximately ¼-inch to approximately ½-inch.

Figure 4:
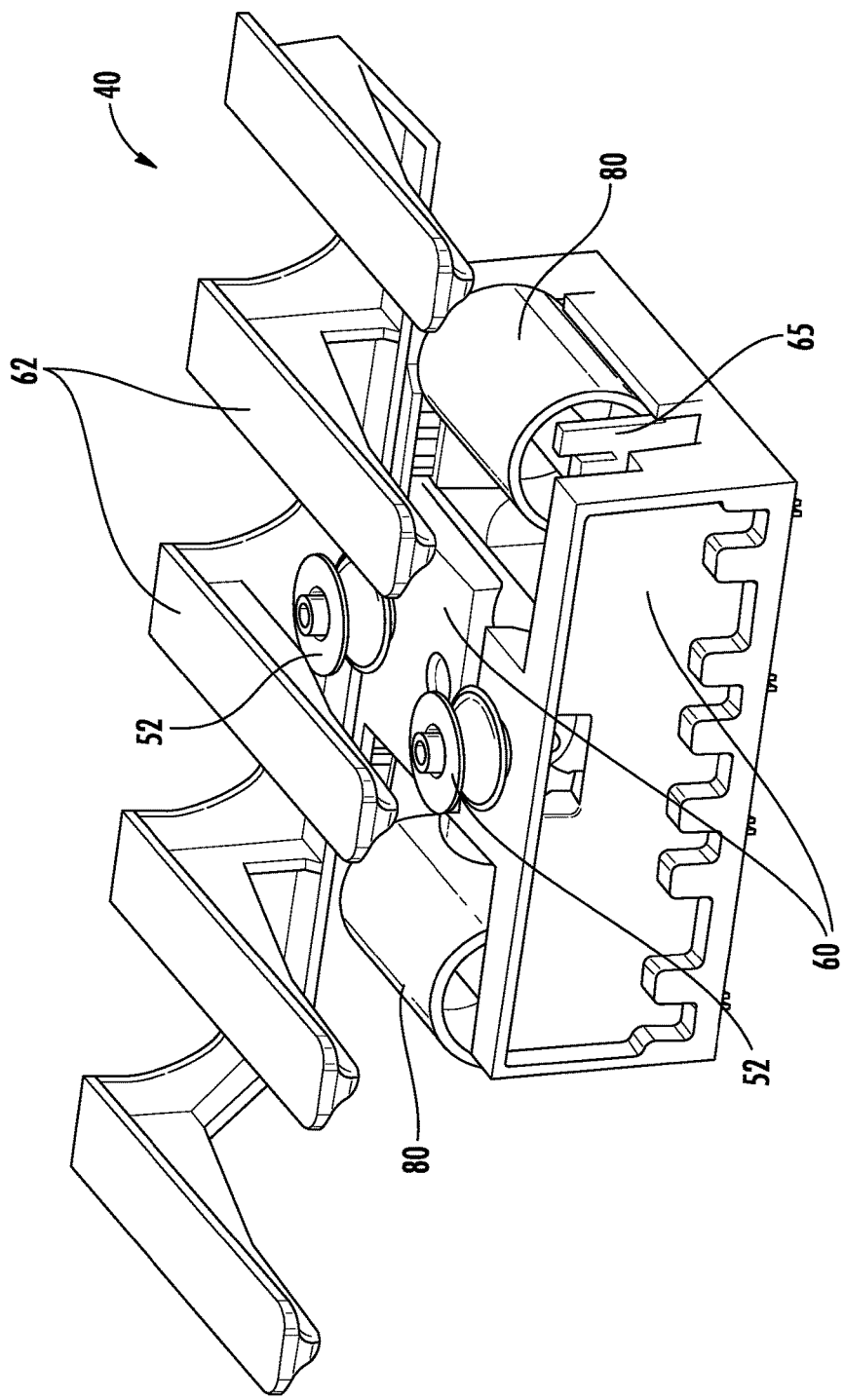
FIG. 4 shows a perspective view of a belt drive assembly according to embodiments of the present invention.
Figure 5:
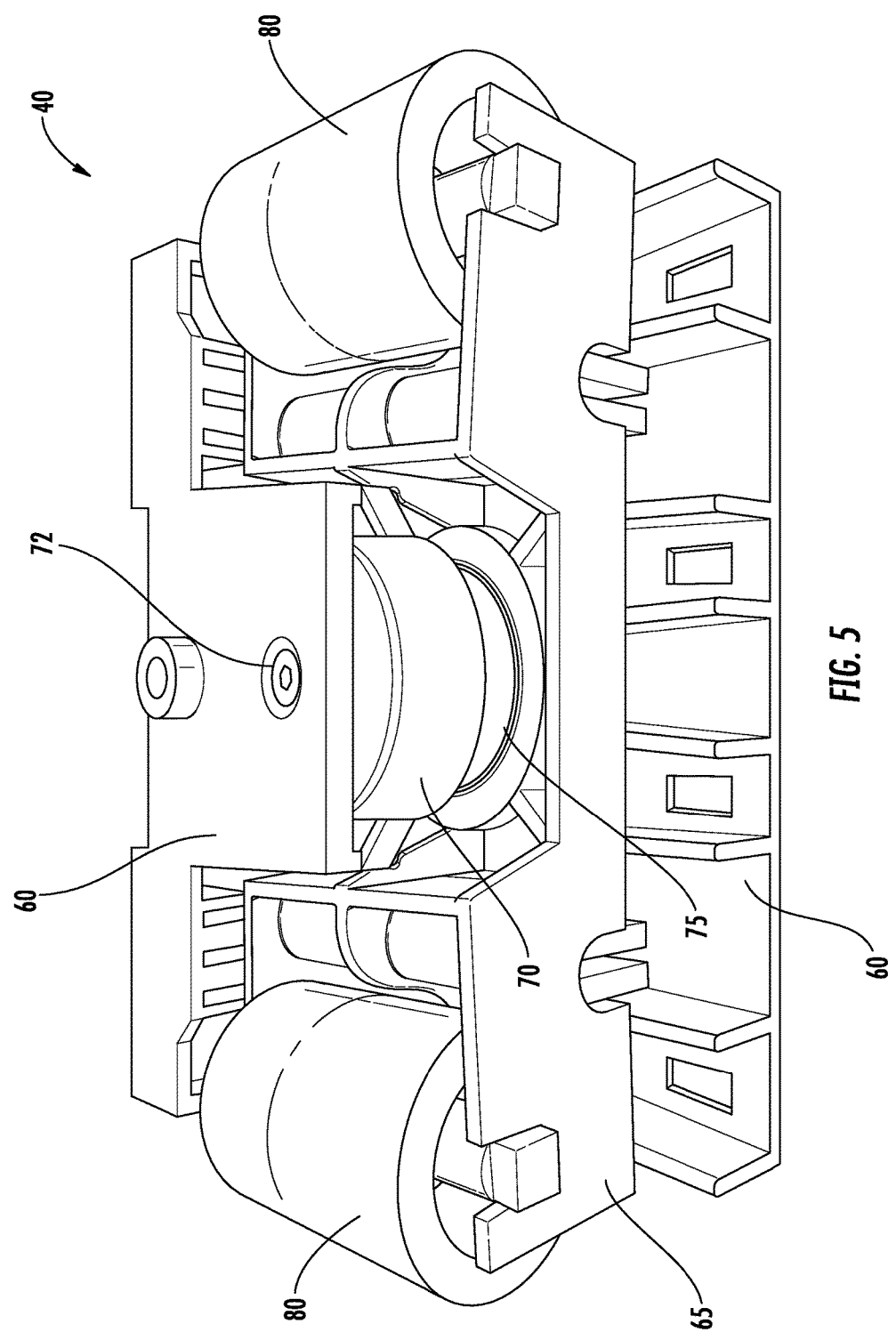
FIG. 5 shows a perspective view of the belt drive assembly of FIG. 4 with portions removed to show the magnet and attractant plate according to embodiments of the present invention.
Figure 6:
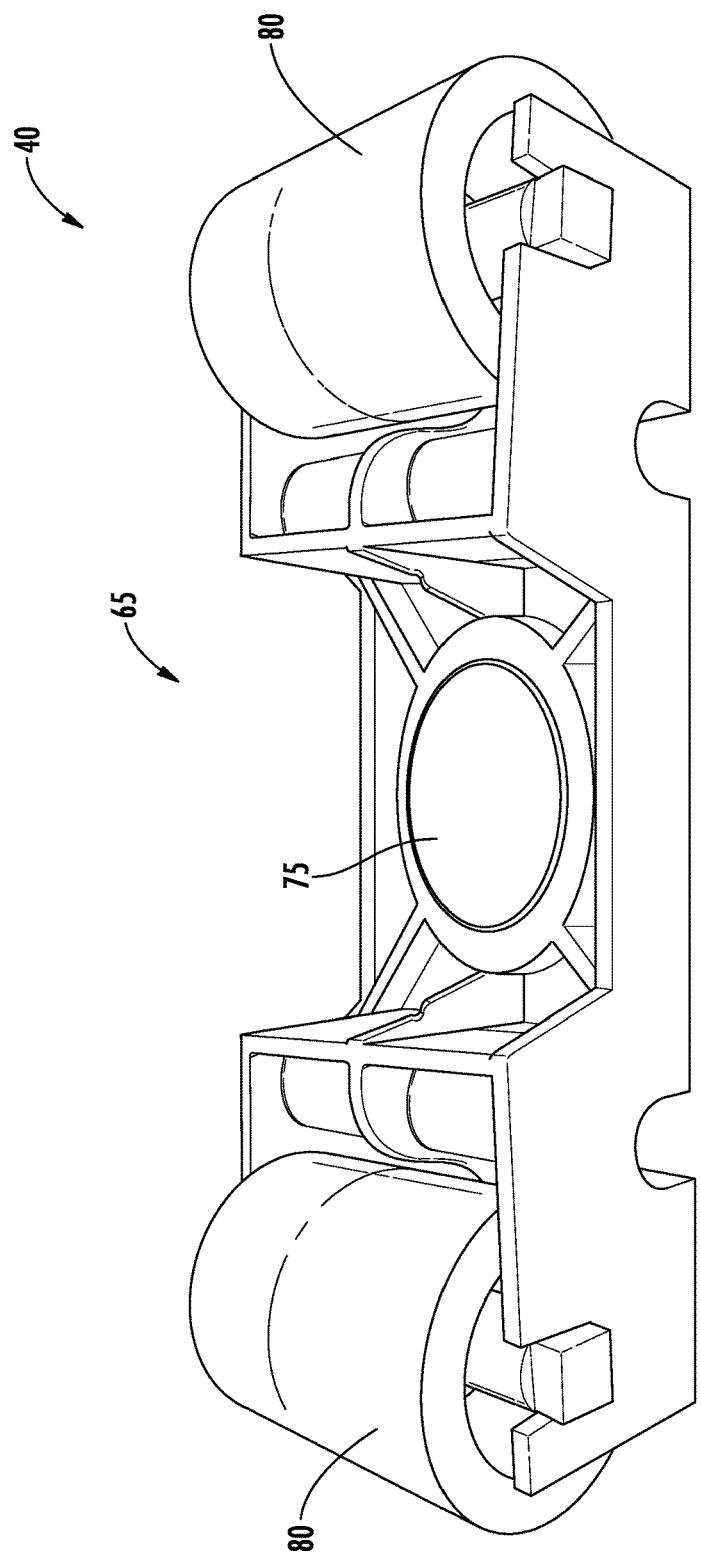
FIG. 6 shows a perspective view of a movable frame of the belt drive assembly with the attractant plate of FIGS. 4 and 5 according to embodiments of the present invention.

Turning to FIGS. 4-6, embodiments of the belt drive assembly are described in more detail. In some embodiments, the assembly 40 comprises a stationary frame 60 and a movable frame 65 that is configured to be supported within and movable with respect to the stationary frame. In this regard, the stationary frame 60 may be configured to be fixed to a support structure of a belt-driven live roller conveyor (such as the belt-driven live roller conveyor 10 of FIGS. 1 and 2). The stationary frame 60 may include various features for facilitating the operation of the conveyor, such as guards 62 (shown in FIG. 4) that are configured to be disposed between the tread rollers 35 shown in FIG. 2 to prevent product (e.g., small packages or portions of product conveyed on the tread rollers) from falling in between the tread rollers and also to protect against an operator's fingers, hair, or clothing getting pulled into the nip point between the belt and the rollers.

According to some embodiments of the invention, an electric actuating assembly is provided that is configured to cause the movable frame to move towards a respective portion of the stationary frame, such that the assembly achieves a driving configuration. For example, the electric actuating assembly may include a first magnetic component secured to the stationary frame and a second magnetic component secured to the movable frame. As described in greater detail below with reference to the figures, one of the first magnetic component or the second magnetic component may be an electrically actuated magnet 70, and the other of the first magnetic component or the second magnetic component may be an attractant plate 75. Thus, in the driving configuration, a driven belt may be caused (e.g., by movement of the movable frame) to engage at least one tread roller of the belt-driven live roller conveyor as a result of an attractive force between the magnet 70 and the attractant plate 75 when electrically actuated, such that a product supported by the at least one tread roller that is engaged by the belt is conveyed along the belt-driven live roller conveyor.

Accordingly, in some embodiments a magnet 70, shown in FIG. 5, may be secured to the stationary frame 60. The magnet 70 may be any type of magnet configured to selectively attract or repel a corresponding attractant plate 75, such as a permanent magnet, an electromagnet, a solenoid, etc. For example, in some embodiments, the magnet 70 may be secured to the stationary frame 60 via mechanical means (e.g., clamp, fastener, etc.) or via adhesive means (e.g., epoxy, glue, etc.) and may be oriented in a direction facing the movable frame 65, as illustrated. In the depicted embodiment, the magnet 70 is secured to the stationary frame 60 via a mechanical fastener 72.

The attractant plate 75 may be secured to the movable frame 65, as shown in FIGS. 5 and 6. The attractant plate 75 may be a member of any suitable size, shape, or material that, when the magnet 70 is producing a magnetic force, reacts to the magnetic force and is attracted to or repelled from the magnet, respectively. For example, in some cases, the attractant plate 75 may be a circular piece of metal, such as a circular metal plate with a diameter of approximately 2 inches and a thickness of approximately ⅛-inch; however, the attractant plate may have different sizes (diameter, width, length, thickness, etc.) and, in some cases, may have other shapes, such as square, rectangular, elliptical, etc. The attractant plate 75 may be secured to the movable frame 65 via mechanical means (e.g., clamp, fastener, etc.) or via adhesive means (e.g., epoxy, glue, etc.) and may be oriented in a direction facing the stationary frame 60 and, in particular, the magnet 70. In the depicted embodiment, the attractant plate 75 is secured to the movable frame 65 via adhesive.

In some embodiments, the magnet 70 is an electromagnet or a solenoid. For example, in some embodiments, such as shown in FIGS. 5 and 6, the magnet 70 is configured to be actuated (e.g., configured to exert a magnetic force) upon the application of an electric current. Although in FIGS. 5 and 6 the magnet 70 is secured to the stationary frame 60 and the attractant plate 75 is secured to the movable frame 65, it is to be understood in light of this disclosure that in other cases the attractant plate 75 may be secured to the stationary frame 60 and the magnet 70 may be secured to the movable frame 65.

In either case, the magnet 70 may be substantially aligned with the attractant plate 75 such that, in an actuated state in which an electric current is applied to the magnet (e.g., the electromagnet or solenoid), the magnet 70 and the attractant plate 75 are magnetically drawn to each other. In the depicted embodiment, because the magnet 70 is secured to the stationary frame 60 and the attractant plate 75 is secured to the movable frame 65, the attraction between the two components 70, 75 causes the movable frame to move towards a respective portion of the stationary frame.

With reference to FIG. 5, the assembly 40 may further comprise at least one pressure roller 80 that is supported by the movable frame 65. For example, in some embodiments, the assembly 40 may comprise a pair of pressure rollers 80 that are disposed at opposite ends of the movable frame 65, as shown. The assembly 40 may further include a belt 50 supported by the assembly such that the belt is in engagement with and is supported by at least one pressure roller 80. For example, in the depicted embodiment of FIGS. 4 and 5, a pair of pressure rollers 80 is provided that are together configured to engage and drive the belt 50. In this regard, in an actuated state in which an electric current is applied to the magnet 70 to create an attractive force between the magnet and the attractant plate 75, the pair of pressure rollers 80 may move with the movable frame 65 to position the belt 50 (or a portion of the belt 50') in engagement with the at least one tread roller 35 of the belt-driven live roller conveyor 10, as shown in FIG. 3. As a result of such contact between the belt 50 and the at least one tread roller 35, as described above with reference to FIG. 3, the engaged tread rollers 35 may be turned, and the product supported by the turning tread rollers 35 may be advanced along the path of the conveyor.

In some embodiments, in a non-actuated state in which the electric current is removed from the magnet 70, the magnet and the attractant plate 75 cease to be magnetically drawn to each other, and gravity causes the movable frame 65 to move with respect to the stationary frame 60, such that the assembly returns to a non-driving configuration in which the belt 50 is disengaged from the at least one tread roller 35 (shown by the position of the solid-line belt in FIG. 3). As a result, the product supported by the at least one tread roller 35 that was previously engaged by the belt 50 or belt portion 50' may cease to be conveyed along the belt-driven live roller conveyor, and product may accumulate in that zone.

In other embodiments, however, the magnet 70 and the attractant plate 75 may be configured to be electrically actuated to disengage the belt 50 from the at least one tread roller 35. For example, the magnet 70 and the attractant plate 75 may be configured such that, when actuated, the magnet 70 and the attractant plate 75 repel each other, thereby causing the movable frame 65 to move away from the stationary frame 60 and returning the assembly to a non-driving configuration. In some cases, for example, actuation of the magnet 70 to disengage the belt 50 from the at least one tread roller 35 may reverse the polarity of the magnet, thereby causing it to repel the attractant plate 75. In still other embodiments, the movable frame 65 may be biased towards a respective portion of the stationary frame 60, such as due to a spring or other mechanically biasing mechanism (not shown) that serves to bias the actuating assembly in a position to drive the belt, for example, biasing the belt 50 (or a portion of the belt 50') in engagement with the at least one tread roller 35 of the belt-driven live roller conveyor 10. In this case, upon actuation of the magnet 70, the magnet 70 and the attractant plate 75 may repel each other, thereby causing the movable frame 65 to move away from the stationary frame 60 and returning the assembly to a non-driving configuration.

Embodiments of the assembly 40 may include further features in addition to those described above and shown in the figures. For example, with reference to FIG. 4, in some embodiments the stationary frame 60 may comprise a pair of belt guides 52 disposed on an exterior surface of the stationary frame, as shown. The pair of belt guides 52 may be configured to maintain the belt 50 (shown in FIGS. 2 and 3) in an operational position with respect to the pair of pressure rollers 80. For example, the pressure rollers 80 may be configured (e.g., sized, shaped, positioned, etc.) to apply a certain amount of tension to the belt 50 to maintain the belt in frictional contact with the pressure rollers 80 sufficient to transmit a driving force to the belt that can in turn be transmitted to the tread rollers 35 of FIGS. 2 and 3. The pair of belt guides 52 may be configured (e.g., sized, shaped, positioned, etc.) to position the belt 50 such that it remains in optimal contact with the pressure rollers 80 and can function effectively and efficiently to transmit the applied driving force to the tread rollers 35, as described above.

In the example shown in FIG. 3, every assembly including two pressure rollers 80 may be configured to drive four tread rollers 35, labeled D, as described above. The length of the conveyor corresponding to the four driven tread rollers 35 may, in some cases, only be one foot of conveyor, such as in cases where the tread rollers are on three-inch centers. Rather than adding more drive assemblies to drive an additional length of the conveyor, in some embodiments, one or more of the four driven tread rollers D may be operably connected to additional rollers R via drive transmission members 82, such as O-rings or belts, as shown in FIG. 3. Although in FIG. 3 only one of the driven tread rollers D is operably connected to only one additional roller R, each of multiple driven tread rollers may be operably connected to multiple additional rollers. In this way, the accumulation zone may be made longer without the cost of needing to add more drive assemblies or supplying the power for controlling them.

According to embodiments of the invention described herein, a method of driving at least one tread roller of a belt-driven live roller conveyor is also provided. The method may comprise electrically actuating one of a first magnetic component or a second magnetic component of a belt drive assembly, where one of the magnetic components is secured to a stationary frame that is configured to be fixed to a support structure of a belt-driven live roller conveyor. The other of the magnetic components is secured to a movable frame supported within and movable with respect to the stationary frame. In this regard and as described above, the first magnetic component may be a magnet, such as an electromagnet or a solenoid, and the second magnetic component may be an attractant plate. The first and second magnetic components may be substantially aligned with each other such that, in an actuated state in which an electric current is applied, the first and second magnetic components are magnetically drawn to each other and cause the movable frame to move towards a respective portion of the stationary frame, such that the assembly achieves a driving configuration, as described above. Moreover, in the driving configuration, a belt supported by the assembly may engage at least one tread roller of the belt-driven live roller conveyor, such that a product supported by the at least one tread roller that is engaged by the belt is conveyed along the belt-driven live roller conveyor.

The method may further comprise removing the electric current from a respective one of the first magnetic component or the second magnetic component, such that the first and second magnetic components cease to be magnetically drawn to each other. In such embodiments, gravity may cause the movable frame to move with respect to the stationary frame such that the assembly returns to a non-driving configuration in which the belt is disengaged from the at least one tread roller and the product supported by the at least one tread roller that was previously engaged by the belt ceases to be conveyed along the belt-driven live roller conveyor, allowing product to accumulate in that zone.

As noted above, the conveyor system 10 shown in FIG. 1 may be configured in various ways and may include one or more belt drive assemblies 40 configured according to the embodiments described herein. Moreover, as used in the context of describing embodiments of the invention herein, it is to be understood by one skilled in the art in light of this disclosure that upon disengagement of the driven belt from the tread rollers, the product supported by the tread rollers may continue to move for a brief time based on the momentum imparted to them by the movement of the tread rollers while engaged with the belt, as well as the movement and force imparted by other product in the vicinity. Thus, although a positive driving force may not be applied to the tread rollers when the belt drive assembly is in the non-driving configuration described herein, it is understood that there may be a delay between the time the belt drive assembly disengages from the respective tread rollers to the time the product supported by the tread rollers ceases to be conveyed along the belt-driven live roller conveyor and the product can accumulate in the respective area of the conveyor, and in some cases the product may not stop moving at all, but may only slow down enough to allow product to accumulate.

Many other modifications and embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A belt drive assembly for driving at least one tread roller of a belt-driven live roller conveyor, the assembly comprising:
   a stationary frame configured to be fixed to a support structure of a belt-driven live roller conveyor;
   a first magnetic component secured to the stationary frame;
   a movable frame configured to be supported within and movable with respect to the stationary frame; and
   a second magnetic component secured to the movable frame, wherein one of the first magnetic component or the second magnetic component is an electrically actuated magnet and the other of the first magnetic component or the second magnetic component is an attractant plate,
   wherein the second magnetic component is substantially aligned with the first magnetic component such that, in an actuated state in which an electric current is applied to a respective one of the first or second magnetic components, the first and second magnetic components are magnetically drawn to each other and cause the movable frame to move towards a respective portion of the stationary frame, such that the assembly achieves a driving configuration, and
   wherein in the driving configuration a driven belt engages at least one tread roller of the belt-driven live roller conveyor, such that a product supported by the at least one tread roller that is engaged by the belt is conveyed along the belt-driven live roller conveyor.

2. The assembly of claim 1, wherein, in a non-actuated state in which the electric current is removed from a respective one of the first or second magnetic components, the first and second magnetic components cease to be magnetically drawn to each other and gravity causes the movable frame to move with respect to the stationary frame such that the assembly returns to a non-driving configuration in which the belt is disengaged from the at least one tread roller.

3. The assembly of claim 1, wherein the first magnetic component is an electromagnet or a solenoid and the second magnetic component is an attractant plate.

4. The assembly of claim 1, wherein the second magnetic component is an electromagnet or a solenoid and the first magnetic component is an attractant plate.

5. The assembly of claim 1, wherein the stationary frame comprises a pair of pressure rollers disposed at opposite ends of the movable frame, wherein the pair of pressure rollers is configured to engage and drive the belt, wherein in the actuated state in which an electric current is applied to a respective one of the first or second magnetic components, the pair of pressure rollers moves with the movable frame to move the belt into engagement with the at least one tread roller of the belt-driven live roller conveyor.

6. The assembly of claim 5, wherein the stationary frame comprises a pair of belt guides disposed on the stationary frame and configured to maintain the belt in an operational position with respect to the pair of pressure rollers.

7. The assembly of claim 1, wherein at least one of the driven tread rollers is operably connected to an additional tread roller via a drive transmission member.

8. A belt drive assembly for driving at least one tread roller of a belt-driven live roller conveyor, the assembly comprising:
 a stationary frame configured to be fixed to a support structure of a belt-driven live roller conveyor;
 a movable frame configured to be supported within and movable with respect to the stationary frame;
 an electric actuating assembly configured to cause the movable frame to move with respect to a respective portion of the stationary frame, such that the assembly is moved between a driving configuration and a non-driving configuration,
 wherein in the driving configuration a driven belt is engaged with at least one tread roller of the belt-driven live roller conveyor, such that a product supported by the at least one tread roller that is engaged by the belt is conveyed along the belt-driven live roller conveyor, and
 wherein in the non-driving configuration the driven belt is disengaged from the at least one tread roller of the belt-driven live roller conveyor, such that the product supported by the at least one tread roller is accumulated along the belt-driven live roller conveyor.

9. The assembly of claim 8, wherein the electric actuating assembly comprises:
 a first magnetic component secured to the stationary frame; and
 a second magnetic component secured to the movable frame, wherein one of the first magnetic component or the second magnetic component is an electrically actuated magnet and the other of the first magnetic component or the second magnetic component is an attractant plate,
 wherein the second magnetic component is substantially aligned with the first magnetic component such that, in an actuated state in which an electric current is applied to a respective one of the first or second magnetic components, the first and second magnetic components are magnetically drawn to each other and cause the movable frame to move towards a respective portion of the stationary frame, such that the assembly achieves the driving configuration.

10. The assembly of claim 8, wherein the electric actuating assembly comprises:
 a first magnetic component secured to the stationary frame; and
 a second magnetic component secured to the movable frame, wherein one of the first magnetic component or the second magnetic component is an electrically actuated magnet and the other of the first magnetic component or the second magnetic component is an attractant plate,
 wherein the second magnetic component is substantially aligned with the first magnetic component such that, in an actuated state in which an electric current is applied to a respective one of the first or second magnetic components, the first and second magnetic components magnetically repel each other and cause the movable frame to move away from a respective portion of the stationary frame, such that the assembly achieves the non-driving configuration.

11. The assembly of claim 9, wherein the second magnetic component is an electromagnet or a solenoid and the first magnetic component is an attractant plate.

12. A method of driving at least one tread roller of a belt-driven live roller conveyor, the method comprising:
 electrically actuating one of a first magnetic component or a second magnetic component of a belt drive assembly, wherein the first magnetic component is secured to a stationary frame that is configured to be fixed to a support structure of a belt-driven live roller conveyor and the second magnetic component is secured to a movable frame supported within and movable with respect to the stationary frame;
 wherein electrically actuating one of the first magnetic component or the second magnetic component causes the movable frame to move towards a respective portion of the stationary frame, such that the assembly achieves a driving configuration, and
 wherein in the driving configuration a driven belt engages at least one tread roller of the belt-driven live roller conveyor, such that a product supported by the at least one tread roller that is engaged by the belt is conveyed along the belt-driven live roller conveyor.

13. The assembly of claim 9, wherein the first magnetic component is an electromagnet or a solenoid and the second magnetic component is an attractant plate.

14. The method of claim 12 further comprising:
 removing the electric current from a respective one of the first magnetic component or the second magnetic component, such that the first and second magnetic components cease to be magnetically drawn to each other and gravity causes the movable frame to move with respect to the stationary frame such that the assembly returns to a non-driving configuration in which the belt is disengaged from the at least one tread roller.

15. The method of claim 12, wherein the first magnetic component is an electromagnet or a solenoid and the second magnetic component is an attractant plate.

16. The method of claim 12, wherein the second magnetic component is an electromagnet or a solenoid and the first magnetic component is an attractant plate.

17. The method of claim 12, wherein the stationary frame comprises a pair of pressure rollers disposed at opposite ends of the movable frame, wherein the pair of pressure rollers is configured to engage and drive the belt, wherein in the actuated state in which an electric current is applied to a respective one of the first or second magnetic components, the pair of pressure rollers moves with the movable frame to move the belt into engagement with the at least one tread roller of the belt-driven live roller conveyor.

18. The method of claim 17, wherein the stationary frame comprises a pair of belt guides disposed on the stationary frame and configured to maintain the belt in an operational position with respect to the pair of pressure rollers.

19. The method of claim 17 further comprising transmitting drive from at least one of the driven tread rollers to an additional roller via a drive transmission member.

* * * * *